US009800504B2

(12) United States Patent
Renzullo et al.

(10) Patent No.: US 9,800,504 B2
(45) Date of Patent: Oct. 24, 2017

(54) METHODS, SYSTEMS, AND COMPUTER READABLE MEDIA DIVERTING DIAMETER TRAFFIC FROM AN OVERLOADED POLICY AND CHARGING RULES FUNCTION (PCRF)

(71) Applicant: Oracle International Corporation, Redwood Shores, CA (US)

(72) Inventors: Jared Michael Renzullo, Hudson, MA (US); Tarek Assali, Wellesley, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/918,541

(22) Filed: Oct. 20, 2015

(65) Prior Publication Data

US 2017/0111279 A1 Apr. 20, 2017

(51) Int. Cl.
*H04L 12/26* (2006.01)
*H04L 12/803* (2013.01)
(Continued)

(52) U.S. Cl.
CPC ........ *H04L 47/122* (2013.01); *H04L 12/1407* (2013.01); *H04L 12/2856* (2013.01);
(Continued)

(58) Field of Classification Search
CPC .............. H04L 47/122; H04L 12/1407; H04L 12/2856; H04L 45/02; H04L 45/22; H04L 45/40
See application file for complete search history.

(56) References Cited

U.S. PATENT DOCUMENTS 8,468,267 B2   6/2013   Yigang et al.
8,566,474 B2  10/2013   Kanode et al.
(Continued)

FOREIGN PATENT DOCUMENTS

CN ZL 201380027543.6   7/2017
EP      2 280 520 A1    2/2011
(Continued)

OTHER PUBLICATIONS

Applicant-Initiated Interview Summary for U.S. Appl. No. 13/863,351 (May 27, 2016).
(Continued)

*Primary Examiner* — Minh-Trang Nguyen
(74) *Attorney, Agent, or Firm* — Jenkins, Wilson, Taylor & Hunt, P.A.

(57) ABSTRACT

The subject matter described herein includes methods, systems, and computer readable media for implementing intelligent routing via diverting Diameter traffic from an overloaded Policy and Rules Charging Function (PCRF). An exemplary method includes receiving, at a Diameter Routing Agent (DRA), a first session establishment request for a subscriber and generating a routing entry in a routing table that associates the subscriber with a first destination identifier identifying a first PCRF. The method also includes receiving an indication that the first PCRF is overloaded, receiving a second session establishment request for the subscriber, and generating a new routing entry in the routing table that associates the subscriber with a second destination identifier that does not identify the first PCRF.

21 Claims, 5 Drawing Sheets

(51) Int. Cl.
*H04L 12/14* (2006.01)
*H04L 12/28* (2006.01)
*H04L 12/751* (2013.01)
*H04L 12/707* (2013.01)
*H04L 12/721* (2013.01)

(52) U.S. Cl.
CPC .............. *H04L 45/02* (2013.01); *H04L 45/22* (2013.01); *H04L 45/70* (2013.01)

(56) References Cited

U.S. PATENT DOCUMENTS

| | | | |
|---|---|---|---|
| 8,601,073 | B2 | 12/2013 | Craig et al. |
| 8,613,073 | B2 | 12/2013 | McCann et al. |
| 8,879,431 | B2 | 11/2014 | Ridel et al. |
| 9,450,872 | B2 | 9/2016 | Campbell et al. |
| 9,699,045 | B2 | 7/2017 | Roach et al. |
| 9,699,076 | B2 | 7/2017 | Renzullo et al. |
| 2003/0200277 | A1 | 10/2003 | Kim |
| 2009/0083861 | A1 | 3/2009 | Jones |
| 2009/0185494 | A1 | 7/2009 | Li et al. |
| 2009/0265467 | A1 | 10/2009 | Peles |
| 2010/0281170 | A1* | 11/2010 | Rui ..................... H04L 12/1407 709/227 |
| 2010/0299451 | A1 | 11/2010 | Yigang et al. |
| 2011/0040845 | A1 | 2/2011 | Cai et al. |
| 2011/0061061 | A1 | 3/2011 | Chen et al. |
| 2011/0158090 | A1 | 6/2011 | Riley et al. |
| 2013/0041994 | A1 | 2/2013 | Terrien et al. |
| 2013/0275583 | A1 | 10/2013 | Roach et al. |
| 2013/0322327 | A1 | 12/2013 | Jorgensen et al. |
| 2014/0187199 | A1 | 7/2014 | Yan et al. |
| 2014/0376380 | A1 | 12/2014 | Campbell et al. |
| 2015/0236915 | A1 | 8/2015 | Mohammed et al. |
| 2016/0080578 | A1* | 3/2016 | Stenfelt ............... H04L 41/5025 455/406 |
| 2016/0112275 | A1 | 4/2016 | Park et al. |
| 2016/0366061 | A1 | 12/2016 | Renzullo et al. |

FOREIGN PATENT DOCUMENTS

| | | |
|---|---|---|
| JP | 2011/166737 A | 8/2011 |
| JP | 6059336 | 1/2017 |
| KR | 10-2009-0029348 | 3/2009 |
| WO | WO 2009/070179 A1 | 6/2009 |
| WO | WO 2013/155535 A1 | 10/2013 |

OTHER PUBLICATIONS

Notice of Allowance for U.S. Appl. No. 14/313,610 (May 20, 2016).
Applicant-Initiated Interview Summary for U.S. Appl. No. 14/313,610 (Apr. 26, 2016).
Non-Final Office Action for U.S. Appl. No. 13/863,351 (Mar. 17, 2016).
Non-Final Office Action for U.S. Appl. No. 14/313,610 (Jan. 11, 2016).
Extended European Search Report for European Application No. 13776083.1 (Dec. 14, 2015).
Advisory Action for U.S. Appl. No. 13/863,351 (Nov. 25, 2015).
Final Office Action for U.S. Appl. No. 13/863,351 (Sep. 11, 2015).
Commonly-assigned, co-pending U.S. Appl. No. 14/735,072 for "Methods, Systems, and Computer Readable Media for Implementing Intelligent Policy and Charging Rules Function (PCRF) Overload Control," (Unpublished, filed Jun. 9, 2015).
Non-Final Office Action for U.S. Appl. No. 13/863,351 (Mar. 27, 2015).
Communication of European publication number and information on the application of Article 67(3) EPC for European Application No. 13776083.1 (Jan. 21, 2015).
Korhonen et al., "Diameter Overload Indication Conveyance draft-ietf-dime-ovli-06.txt," Diameter Maintenance and Extensions (DIME), https://tools.ietf.org/html/draft-ietf-dime-ovli-06, pp. 1-51 (Jan. 8, 2015).
Notification of Transmittal of the International Search Report and the Written Opinion of the International Searching Authority, or the Declaration for International Application No. PCT/US2013/036664 (Jul. 2, 2013).
Campbell, "Diameter Overload Control Solution Issues," draft-campbell-dime-overload-issues-00, pp. 1-16 (Jun. 2013).
Roach et al., "A Mechanism for Diameter Overload Control," draft-roach-dime-overload-ctrl-03, DIME, pp. 1-49 (May 17, 2013).
Korhonen et al., "The Diameter Overload Control Application (DOCA)," draft-korhonen-dime-ovl-01.txt, Diameter Maintenance and Extensions (DIME), pp. 1-18 (Feb. 25, 2013).
Fajardo et al., "Diameter Base Protocol," RFC 6733, pp. 1-152 (Oct. 2012).
McMurry et al., "Diameter Overload Control Requirements," draft-ietf-dime-overload-reqs-00, pp. 1-25 (Sep. 21, 2012).
"Multi-Protocol Routing Agent User's Guide," Policy Management, 910-6404-001 Revision A, Copyright 2012 Tekelec (Jun. 2012).
Calhoun et al., "Diameter Base Protocol," RFC 3588, pp. 1-147 (Sep. 2003).
Letter Regarding Decision to Grant Chinese Patent Application No. ZL201380027543.6 (dated May 3, 2017).
Notice of Allowance and Fee(s) Due for U.S. Appl. No. 13/863,351 (dated Apr. 20, 2017).
Notice of Allowance and Fee(s) Due for U.S. Appl. No. 14/735,072 (dated Mar. 29, 2017).
Letter regarding notice of grant for Japanese Patent Application No. 2015/505985 (dated Nov. 29, 2016).
Applicant-Initiated Interview Summary for U.S. Appl. No. 13/863,351 (dated Nov. 9, 2016).
Non-Final Office Action for U.S. Appl. No. 14/735,072 (dated Oct. 28, 2016).
Notification of the First Office Action for Chinese Patent Application No. 201380027543.6 (dated Sep. 30, 2016).
Letter regarding Office Action for Japanese Patent Application No. 2015-505985 (dated Sep. 6, 2016).
Final Office Action for U.S. Appl. No. 13/863,351 (dated Aug. 26, 2016).

* cited by examiner

METHODS, SYSTEMS, AND COMPUTER READABLE MEDIA DIVERTING DIAMETER TRAFFIC FROM AN OVERLOADED POLICY AND CHARGING RULES FUNCTION (PCRF)

TECHNICAL FIELD

The subject matter described herein relates to routing traffic to one or more Policy and Charging Rules Functions (PCRFs). More particularly, the subject matter described herein relates to methods, systems, and computer readable media for diverting Diameter traffic from an overloaded PCRF.

BACKGROUND

Policy and Charging Rules Functions (PCRFs) are network nodes that perform policy and charging functions for a network. The PCRF function is invoked when another node establishes a policy and charging control session with the PCRF. For example, a Packet Data Network (PDN) Gateway (PGW) or other node may establish a session with a PCRF to either obtain policy and charging instructions for sessions involving a given end user or to authorize and set up policy and charging rules associated with a service.

A Diameter routing agent (DRA) assigns sessions to PCRFs and routes messages associated with a session to the PCRF to which the corresponding session has been assigned. Once a session is assigned to a PCRF, all traffic associated with that subscriber and session is typically routed to the same PCRF until the session is terminated.

At some point during a session, however, an assigned PCRF may reach a maximum capacity, for example, during a traffic burst, a traffic storm, situations where a large quantity of background tasks are running, etc., and reach an overloaded state. To date, overloaded PCRFs are configured to respond to requests with a result code indicating that the PCRF is busy. Thus, some requests are simply rejected and not completed successfully. This is problematic, especially for subscribers that have already been assigned to a PCRF, as that subscriber may be denied service for an extended period of time, for example, for at least an amount of time that the PCRF remains overloaded.

Conventional methods of providing intelligent routing within a Diameter network include assigning new subscriber sessions to PCRFs that are not overloaded. This solution fails to address the problem associated with denying requests of subscribers that have previously been assigned to a PCRF.

Accordingly, a need exists for methods, systems, and computer readable media for diverting Diameter traffic from an overloaded PCRF. In some aspects, a DRA is configured to implement intelligent overload control via diverting Diameter traffic from an overloaded PCRF.

SUMMARY

The subject matter described herein includes methods, systems, and computer readable media for diverting Diameter traffic around and/or away from an overloaded Policy and Charging Rules Function (PCRF). The Diameter traffic may be diverted to an alternate PCRF that has capacity to process the traffic. An exemplary method for implementing intelligent routing via diverting Diameter traffic from an overloaded PCRF may be performed at a Diameter Routing Agent (DRA). The method includes receiving, at the DRA, a first session establishment request for a subscriber, generating, at the DRA, a routing entry in a routing table that associates the subscriber with a first destination identifier identifying a first PCRF, and receiving, at the DRA, an indication that the first PCRF is overloaded. The method also includes receiving, at the DRA, a second session establishment request for the subscriber and generating, at the DRA, a new routing entry in the routing table that associates the subscriber with a second destination identifier that does not identify the first PCRF.

A system for implementing intelligent routing via diverting Diameter traffic from an overloaded PCRF is provided. An exemplary embodiment of a system for diverting Diameter traffic includes a DRA configured to receive a first session establishment request for a subscriber and generate a routing entry in a routing table that associates the subscriber with a first destination identifier identifying a first PCRF. The system also includes a diverting module accessed by the DRA, wherein the diverting module is configured to receive an indication that the first PCRF is overloaded and, in response to the DRA receiving a second session establishment request for the subscriber, generate a new routing entry in the routing table that associates the subscriber with a second destination identifier that does not identify the first PCRF for diverting traffic from the first PCRF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" and "module" refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
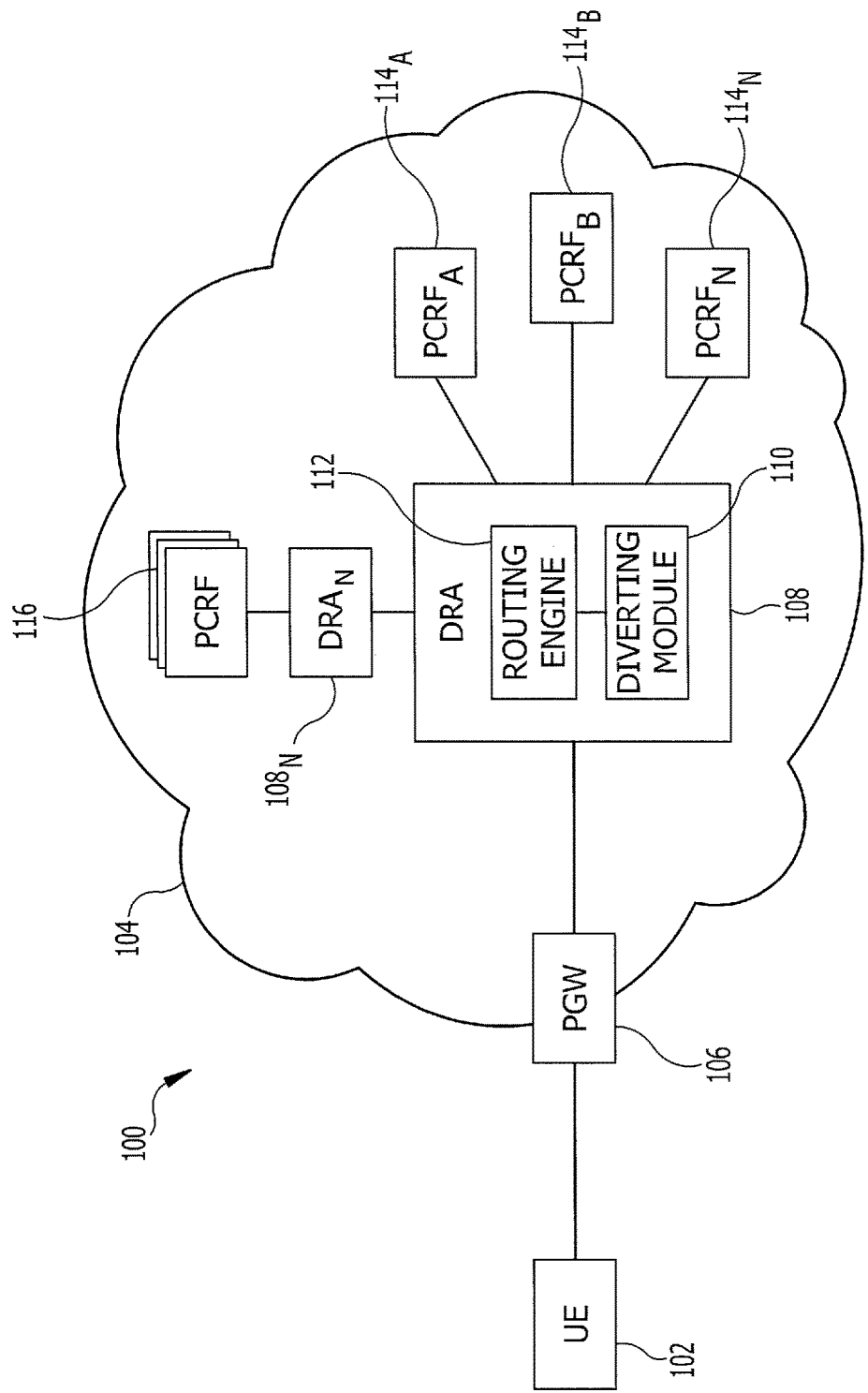
FIG. 1 is a network diagram illustrating intelligent routing via a special purpose computer including a Diameter Routing Agent (DRA) configured to divert Diameter traffic from an overloaded Policy and Charging Rules Function (PCRF) according to an exemplary embodiment of the subject matter described herein.

The subject matter described herein relates to methods, systems, and special purpose computers executing computer readable media for diverting Diameter traffic from an overloaded Policy and Charging Rules Function (PCRF) according to embodiments of the subject matter described herein. Rather than denying a new request received from a previously assigned subscriber (e.g., having an assigned IP address) at an overloaded PCRF via a result code, a special purpose computer and/or computing entity, such as a Diameter Routing Agent (DRA), may divert policy requests (e.g., traffic) to a minimally overloaded PCRF for processing the request. The DRA may also forward the session establishment request to a remote DRA that manages a remote pool of PCRFs, one of which has capacity to process the request. Thus, the DRA is configured to implement improved, intelligent routing that provides more efficient network utilization, and improved policy control by diverting traffic to alternative PCRFs for processing. If not diverted, the requests may otherwise be denied for processing at an assigned PCRF, for example, where the PCRF reaches a maximum capacity and/or is severely overloaded.

FIGS. 1 to 5 illustrate intelligent routing within a network via a DRA. Rather than rejecting messages at an overloaded PCRF, methods, systems, and computer readable media herein are configured to divert traffic from a previously assigned subscriber, either locally or remotely, from an assigned (e.g., overloaded) PCRF. A "local" diversion refers to routing traffic from one PCRF to another PCRF in a same pool of PCRFs. That is, a local diversion refers to situations when a DRA diverts traffic from one PCRF managed by the DRA to another PCRF that is also managed by the same DRA. A "remote" diversion refers to routing the requests to another (remote) DRA that has another (e.g., different) pool of PCRFs. Local and remote diversion of policy requests and/or traffic as set forth herein is beneficial, in some aspects, as service within a network is maximized, more efficient, and/or otherwise improved.

Notably, a network operator may deploy a pool of PCRFs and implement intelligent routing among the pool of PCRFs via an intelligent DRA for maximizing service and minimizing the number of rejected requests within a telecommunications network, a core network, or a policy network. In some embodiments, the DRA filters on overload information when diverting traffic, so that traffic is diverted to a non-overloaded (e.g., or a minimally overloaded) PCRF. The DRA may split an entry in a routing (binding) table. The DRA may generate and store multiple entries for a same subscriber within a routing table. An access point (e.g., a gateway (GW), a PDN Gateway (PGW), or the like) may establish different sessions with a core network, each session being associated with a different session identifier, such as an IP address.

As described herein, a DRA may associate a user-ID with one or more Access Point Names (APNs), IP addresses, and/or destination Ds (e.g., PCRF identifiers, DRA identifiers, or the like). That is, each subscriber within a routing table may be associated with (e.g., assigned and/or bound to) two or more different destination points (e.g., destination IDs), each destination ID corresponding to different PCRFs, different DRAs, combinations thereof, or the like. Methods, systems, and special purpose computing systems described herein are configured to execute a computer readable medium for providing the DRA with intelligence for eliminating traffic communicated to severely overloaded PCRFs via diverting, binding, and/or assigning multiple subscriber sessions to minimally loaded PCRFs.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 illustrates an exemplary network, generally designated 100. Network 100 includes user equipment (UE) 102 utilized by a subscriber for communicating with the access network, which connects with a policy core 104 to process policy and charging requests. Exemplary UEs 102 include any type of mobile or non-mobile device such as a phone, a computer, a smart device, a laptop computer, a tablet computer, a desktop computer, a smart planner or organizer, a smart television, a wearable computer (e.g., a watch or eyeglass mounted computer), or the like.

In some embodiments, policy message traffic originates when UE 102 connects to core 104 via an access node, such as a PDN Gateway (PGW) 106. PGW 106 is shown for exemplary purposes only, and any other type of access node and/or policy enforcement node may be provided in place of PGW 106. As persons having skill in the art will appreciate, one or more intervening nodes (not shown) may also be deployed between UE 102 and PGW 106 for sending, transmitting, and/or otherwise directing traffic towards core 104.

In some embodiments, upon receiving a PDN connection request from UE 102, PGW 106 is configured to assign an IP address to UE 102. The IP address is used to identify UE 102 and may include a unique identifier consisting of alphabetic, numeric, and/or alphanumeric characters, such as an IP address. PGW 106 is configured to assign UE 102 an IP address (e.g., or other identifier), connect UE 102 to core 104, and communicate policy requests to a DRA 108.

In some embodiments, DRA 108 includes a special purpose computer configured to process session establishment requests from PGW 106 and assign subscriber sessions to a PCRF, for processing the policy requests. DRA 108 is configured to bind a subscriber/user identifier to an APN, an IP address, and a destination identifier (e.g., that identifies a PCRF or Diameter node).

In some aspects, DRA 108 is configured to assign and route policy traffic to at least one PCRF of a pool of PCRFs (e.g., $114_A$ to $114_N$). DRA 108 is configured to monitor and store overload information communicated from PCRFs (e.g., $114_A$ to $114_N$), and maximize core efficiency by diverting policy requests (e.g., policy messages or traffic) around and/or away from overloaded PCRFs. The policy requests may be diverted to minimally loaded PCRFs having capabilities to process the requests thereby minimizing rejected requests. After routing a policy request, DRA 108 is configured to store the assignment between UE 102 (e.g., a user identifier) PGW 106 (e.g., an APN), a session ID (e.g., an IP address), and a destination ID (e.g., an identifier associated with PCRFs (e.g., $114_A$ to $114_N$) within a routing table, which is also referred to as a "binding table". As long as the assigned PCRF is not overloaded and/or prior to reaching a maximum capacity, DRA 108 may continue to route traffic according to the binding table. However, when an assigned PCRF (e.g., $114_A$ to $114_N$) becomes overloaded to a certain degree or level, DRA 108 may divert new and/or existing subscriber policy traffic to an alternate destination. Alternate destinations include a minimally loaded PCRF within a same pool of PCRFs or another (remote) DRA, where desired.

Still referring to FIG. 1 and some embodiments, DRA 108 assigns, binds, or otherwise associates policy traffic communicated from UE 102 via PGW 106 to any one PCRF within a pool of PCRFs (e.g., $114_A$ to $114_N$). The assigned PCRF processes policy and/or charging information in the form of credit control requests (CCRs), AA-Requests (AARs), Rx Session-Termination-Request (STR) messages, Sh Push-Notification-Request (PNR) messages, Sy Status Notification Request (SNR) messages, the like, until the session with UE 102 terminates or until the assigned PCRF is overloaded. DRA 108 stores the association (e.g., also referred to a as an assignment or binding) between UE 102 and/or an identifier thereof (e.g., IP address) and its assigned PCRF within a routing or binding table.

In some embodiments, when an assigned PCRF is in an overloaded state, DRA 108 is configured to generate a new routing (binding) entry, or "split" an existing routing entry into two or more entries. Thus, a single subscriber identifier (e.g., UE 102) may be associated with and/or "bound" to multiple destination endpoints including, for example, PCRFs or other alternative Diameter nodes. In some embodiments, DRA 108 is configured to generate and store routing information within a routing table, where the routing information associates a given subscriber ID, session ID, and/or PCRF ID identifying a PCRF within a pool of PCRFs ($114_A$ to $114_N$). For example, DRA 108 may assign and route policy traffic to a first PCRF $114_A$, a second PCRF $114_B$, and/or an "$N^{th}$" PCRF $114_N$ (e.g., where "N" is a whole number integer >2). Each of the respective first to $N^{th}$ PCRFs 114A to 114N are deployed within a same pool of PCRFs, and managed by DRA 108. Each of the respective first to $N^{th}$ PCRFs 114A to 114N includes a unique ID (e.g., a destination ID) for routing purposes.

In some embodiments, a pool of PCRFs (e.g., $114_A$ to $114_N$) may include any number of active PCRFs (e.g., a single PCRF, two PCRFs, more than two PCRFs, more than five PCRFs, more than 10 PCRFs, etc.) as determined by a network operator. DRA 108 is configured to intelligently manage the pool of PCRFs by intelligently routing traffic amongst the pool to balance load within core 104 and prevent one or more PCRFs from reaching a maximum capacity. Notably, where one PCRF is overloaded and/or at a maximum capacity, that PCRF may notify DRA 108 so that DRA may divert and/or otherwise route traffic from the overloaded PCRF.

Still referring to FIG. 1 and in some embodiments, DRA 108 is configured to periodically receive overload information including, for example, an overload level communicated from each PCRF in a pool of PCRFs (e.g., $114_A$ to $114_N$) managed thereby. In some embodiments, DRA 108 is configured to determine an overload level by subscribing to receive overload information communicated by each PCRF $114_A$ to $114_N$. A subscribe/notification mechanism associated with communicating overload information is described, for example, in FIG. 2, and in commonly owned U.S. patent application Ser. No. 14/735,072, filed on Jun. 9, 2015, the disclosure of which is incorporated herein by reference. In some aspects, overload information includes an overload level communicated to DRA 108 using one or more Attribute Value Pairs (AVPs) encoded within the policy traffic. DRA 108 subscribes to overload notification messages from each PCRF, and is configured to extract, receive, store, and/or recall overload information for providing intelligent routing of policy traffic within core 104. Each PCRF within the pool of PCRFs (e.g., $114_A$ to $114_N$) is configured to notify DRA 108 of an overload level (e.g., when load reaches a different usage or percentage level, periodically, automatically, or the like) at which the respective PCRF is operating.

For example and in some embodiments, DRA 108 includes functionality for subscribing to receive overload information from each PCRF within a pool of PCRFs (e.g., $114_A$ to $114_N$). In response to a successful subscription, each PCRF in the pool of PCRFs (e.g., $114_A$ to $114_N$) may periodically publish its respective overload level to DRA 108. A diverting module (DM) 110 disposed at and/or otherwise accessible by DRA 108 may utilize the overload information to filter or look up PCRFs that are not overloaded, and divert traffic away from overloaded PCRFs thereby intelligently routing message traffic, in some aspects, for at least partially implementing intelligent PCRF overload control. PCRFs (e.g., $114_A$ to $114_N$) include functionality for reporting overload levels to DRA 108 via notification messages, either periodically, or in response to a perceptible change in an initial (pre-existing) overload level. For example, where an overload level associated with a given PCRF increases or decreases, that PCRF may notify DRA 108 of the new overload level. The new overload level is then stored within DRA 108 (e.g., in a storage element accessible by DM 110) for improved management of policy resources.

Still referring to FIG. 1 and in some aspects, DRA 108 is configured to route traffic to each PCRF within a pool of PCRFs (e.g., $114_A$ to $114_N$) via a routing engine 112. Routing engine 112 includes and/or has access to DM 110 for processing, routing, and/or diverting traffic according to an overload level received from PCRFs (e.g., $114_A$ to $114_N$). Where an assigned PCRF is overloaded, DM 110 and routing engine 112 collectively determine routing actions and destination IDs based upon a lookup within one or more routing rules, tables, and/or routing (binding) tables. DM 110 is configured to implement intelligent routing via generating, splitting, and storing multiple entries for a subscriber within a routing table for routing one or more sessions associated with the same subscriber to different endpoints, such as different PCRFs. The generated and/or split entries are saved, and any further sessions will be routed according to the latest saved or timestamped record, so that ultimately (e.g., as sessions terminate) all sessions for a subscriber will converge to a single destination ID, such as a single PCRF entry.

Figure 4:
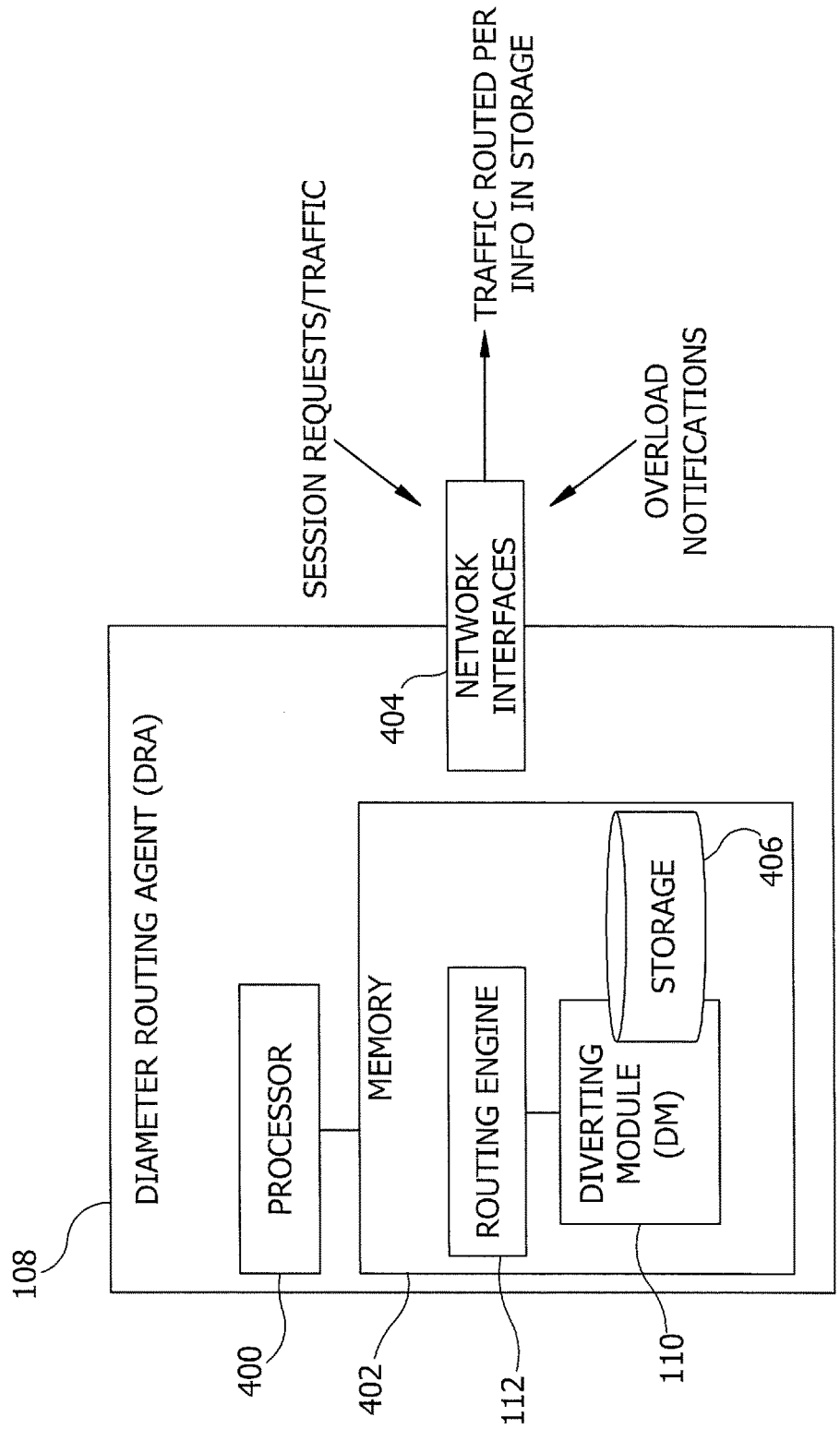
FIG. 4 is a block diagram illustrating a special purpose computer including a DRA suitable to divert Diameter traffic from an overloaded PCRF according to an embodiment of the subject matter described herein.

In some embodiments, routing tables or rules are stored locally at DRA 108 within a storage element (e.g., 406, FIG. 4). The storage element may include a table, a database, a cache, a memory element, a storage device, or the like. In other embodiments, routing tables or rules are stored remotely from DRA 108. Generating and/or splitting entries within a binding table to associate traffic from a single UE 102 with multiple PCRFs maximizes efficiency within core 104 via conserving resources, and reduces damage caused by receiving traffic higher than a PCRF's rated capacity.

DRA 108 is configured to intelligently route policy traffic away from an assigned PCRF either locally or remotely, upon receiving an indication that the assigned PCRF is overloaded. DRA 108 may locally divert traffic from, for example, first PCRF 114$_A$ to another PCRF within the same pool of PCRFs 114$_B$ or 114$_N$. A local pool of PCRFs is managed by and/or exchanges messaging traffic with the same DRA 108. In other aspects, DRA 108 may remotely divert traffic, for example, to another, remote DRA 108$_N$ that is deployed separately from first DRA 108. Remote DRA 108$_N$ may be deployed within core 104, but manage another (e.g., different) pool of PCRFs 116 than DRA 108. DRA 108 may remotely divert traffic when all and/or a majority of PCRFs within its pool of PCRFs 114$_B$ or 114$_N$ are overloaded. Local and/or remote diversion of traffic within core 104 minimizes the number of rejected requests, thereby maximizing efficiency within core 104.

Still referring to FIG. 1 and in some embodiments, PCRFs (e.g., 114$_A$ to 114$_N$) are configured to authorize, implement, and/or make policy decisions including decisions relating to policy and charging, such as rules regarding a Quality of Service (QoS), an amount of bandwidth allocated for a given session and/or subscriber, an amount being charged for a given session, authorization to activate of application functionality, or the like. Policy parameters associated with subscriber traffic may be changed via one or more Policy Charging Control (PCC) rules that are generated by PCRFs (e.g. 114$_A$ to 114$_N$), and passed down to other nodes in network 100, such as policy decision points and/or policy enforcement nodes.

It will be appreciated that FIG. 1 is for illustrative purposes and that various nodes, their locations, and/or their functionality described above in relation to FIG. 1 may be changed, altered, added, or removed. For example, some nodes and/or functionality thereof may be combined into a single entity, or separated into multiple entities. For example, in some embodiments DM 110 may be integrated with and/or disposed at DRA 108 as shown. As will be appreciated by persons of skill in the art, DRA 108 may also access a separate (remote) entity including DM 110. In further embodiments, multiple DRAs (e.g., 108 to 108$_N$) within core 104 may have access a same DM 110, or each DRA (e.g., 108 to 108$_N$) may include its own respective DM 110. Any respective location and/or method of accessing DM 110 may be provided.

Figure 2:
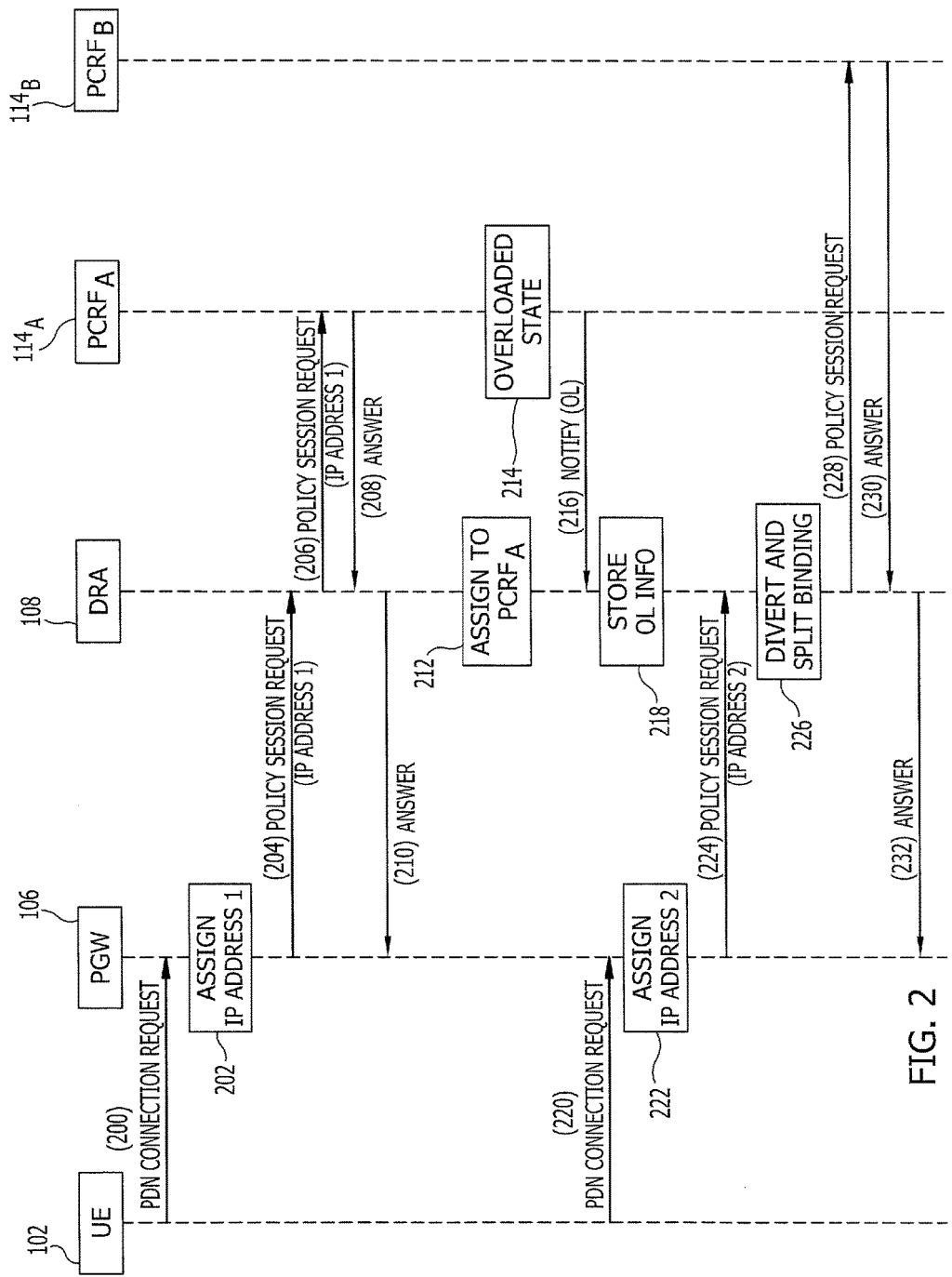
FIG. 2 is a message diagram illustrating exemplary messaging exchanged by and/or between special purpose computing entities for locally diverting Diameter traffic from an overloaded PCRF according to an embodiment of the subject matter described herein.

FIG. 2 is a message diagram illustrating exemplary messaging exchanged by and/or between special purpose computing entities for locally diverting Diameter traffic from an overloaded PCRF according to an embodiment of the subject matter described herein.

As described in the above referenced commonly owned U.S. patent application Ser. No. 14/735,072, DRA 108 may communicate a subscription request message to each PCRF within its respective pool of PCRFs. In response to the subscription request, DRA 108 receives overload information communicated from each PCRF in its pool via notification messages. PCRFs may periodically notify DRA 108 of a respective overload level, or PCRFs may automatically notify DRA 108 when it changes overload level (e.g., via exceeding preset or predefined usage levels).

At line 200, UE 102 communicates a first PDN connection establishment request to PGW 106. At block 202, PGW 106 establishes a data connection with UE 102, and assigns the PDN connection to UE 102 a first IP address (e.g., "IP Address 1").

At line 204, PGW 106 communicates a policy session request to DRA 108. PGW 106 may send a policy request for requesting policy and charging information associated with UE 102.

At line 206, DRA 108 sends the policy session request to first PCRF 114$_A$ according to any routing algorithms or rules. The policy session request may include a CCR, an AAR, or the like. At line 208, first PCRF 114$_A$ sends an answer message (e.g., a CCA, an AAA, or the like) to the policy request received from DRA 108. The request message at line 206 requests establishment of the policy session, and the answer message at line 208 confirms the establishment. DRA 108 answers the policy session request at line 210.

At block 212, DRA 108 assigns the policy session to first PCRF 114$_A$. DRA 108 is configured to generate and/or store one or more routing tables within a storage element (e.g., 406, FIG. 4). DRA 108 is configured to associate subscriber and connection identifiers with an Access Point Name (APN) and the PCRF assigned to the session. The APN may include an identifier and/or name associated with an IP Multimedia Subsystem (IMS) or Internet domain that is trying to establish a policy session with a PCRF. APNs may include a network identifier, an operator identifier (e.g., an operator's web address), a PGW identifier, a PDN identifier, a service identifier, or the like.

Table 1 below is an exemplary embodiment of a routing table with routing information (e.g., also referred to as binding information) that may be generated, stored, and/or accessed by DRA 108 for use in intelligent routing for providing overload control via diverting traffic away from overloaded PCRFs.

TABLE 1

| Entry # | Subscriber (User) ID | IP Address | APN | Destination ID | Timestamp |
|---|---|---|---|---|---|
| 1 | User-ID-1 | IP:10.0.0.1 | IMS | PCRFA | 2015-10-01 02:00:00 |
| 2 | User-ID-2 | IP:10.0.0.2 | IMS | PCRFA | 2015-10-01 03:00:00 |
| 3 | User-ID-N | IP:10.0.0.3 | IMS | PCRFN | 2015-10-01 04:00:00 |

As Table 1 illustrates above, routing information includes multiple entries in which a user identifier or ID (e.g., identifying UE 102), an IP address assigned by PGW 106, and an APN (e.g., a domain name, such as IMS, the Internet, or the like) are each associated with, assigned to, and/or otherwise bound to a destination ID (e.g., identifying a PCRF, a remote DRA, or the like). As indicated by Entry #1 in Table 1 above, a first subscriber ID, "User-ID-1" is assigned an IP address of IP:10.0.0.1 for APN by PGW-1. DRA 108 associates and/or assigns the subscriber policy session to a destination ID that identifies and/or corresponds to first PCRF, e.g., PCRF$_A$ 114$_A$. The timestamp indicates a day and/or time at which the routing entry was made (created), saved, and/or updated.

Still referring to FIG. 2, DRA 108 includes functionality for examining the user ID, IP address, and/or APN within policy session requests for assigning all traffic from a same User ID and/or session to a same PCRF. Although not shown, DRA 108 may also perform a lookup of an overload level associated with first PCRF 114$_A$ prior to assigning traffic thereto, as described the above referenced U.S. patent application Ser. No. 14/735,072.

At block 214, first PCRF 114$_A$ reaches an overloaded state defined by one or more overload levels. For illustration purposes, the overloaded state at block 214 may correspond to a condition at which first PCRF 114$_A$ is at an engineered threshold capacity below its maximum capacity designed to trigger overload control. At line 216, first PCRF 114$_A$ notifies DRA 108 of its respective overload (OL) level. At block 218, DRA 108 stores the OL level communicated from first PCRF $114_A$. Thus, instead of rejecting requests, DRA 108 includes intelligence to divert traffic from first PCRF $114_A$ locally, to another PCRF within a same pool of PCRFs as first PCRF $114_A$.

In some embodiments, DRA 108 is configured to store a respective overload level associated with each PCRF in its pool of PCRFs. Table 2 is an exemplary embodiment of overload information that may be stored at DRA 108 for use in intelligent routing and overload control. The information in Table 2 may be stored in addition to routing information (Table 1), either in a same table as the routing information, or in a different table. DRA 108 may lookup overload levels of one or more PCRFs so that it may divert session traffic away from an overloaded PCRF to a minimally loaded PCRF.

TABLE 2

| PCRF ID | OVERLOAD (OL) LEVEL |
|---|---|
| $PCRF_A$ | LEVEL 3 |
| $PCRF_B$ | LEVEL 0 |
| $PCRF_N$ | LEVEL 2 |

As Table 2 illustrates above, each PCRF includes a unique identifier (e.g., $PCRF_A$ to $PCRF_N$, where N>2). DRA 108 is configured to receive an indication of the OL level associated with each PCRF, and store the information within a table, a database, a cache, a memory element, a storage device, or the like. DRA 108 utilizes the OL level for determining how to route traffic in response to receiving new or existing subscriber traffic. In some embodiments, DRA 108 diverts traffic associated with a previously assigned entity (e.g., a subscriber, session, or the like), for example, by splitting a routing or binding entry, and creating a new entry in which the assigned entity is associated with a different destination ID.

In some embodiments, an OL level of "0" indicates a PCRF that is minimally loaded, and an overload level of "3" indicates a PCRF that is at a maximum overload level, where a PCRF is severely overloaded. As noted in Table 2 above and for exemplary purposes, $PCRF_A$ is in an overloaded state (e.g., block 214) and thus communicates a level 3 overload to DRA 108. DRA 108 is configured to route and/or divert traffic from subscribers that are bound to $PCRF_A$, to another destination (e.g., another PCRF, a remote DRA, or the like).

Still referring to FIG. 2 and in some embodiments, each PCRF (e.g., $114_A$ to $114_N$) may be configured to compute an OL level and notify the subscribing DRA 108 as to its respective OL level. PCRFs (e.g., $114_A$ to $114_N$) may be configured to notify DRA 108 upon perceptible changes in the respective OL level (e.g., increases or decreases) so that DRA 108 may update OL information (e.g., in Table 2) for providing improved, intelligent routing and resource management for implementing overload control via diverting traffic and splitting entries in a routing table.

At line 220, UE 102 sends a new PDN connection request to PGW 106. This may occur, for example, where UE 102 executes applications requiring multiple PDN connections, or the like. UE 102 may request and/or establish multiple sessions with PGW 106. In response to multiple session requests, PGW 106 may assign UE 102 multiple IP addresses. At block 222, PGW 106 assigns the new PDN connection with UE 102 a second IP address (e.g., "IP Address 2").

At line 224, PGW 106 requests a data connection or policy session with a core network by sending a new (second) session establishment request (e.g., a new policy session request) to DRA 108 by which PGW 106 requests policy and charging information associated with UE 102. In some embodiments, when the new session request at line 224 is received at DRA 108 for a new connection with a previously assigned subscriber (i.e., UE 102), which has a User-ID that is already bound to an overloaded PCRF, DRA 108 will split the binding between the User-ID (i.e., UE 102) and its assigned PCRF (e.g., $PCRF_A$, $114_A$) such that the binding will contain multiple (i.e., at least two) destinations IDs (e.g., PCRF IDs). The new entry in the routing table will contain a newly selected, non-overloaded, and alternative PCRF, which may be chosen based upon overload levels communicated from each PCRF within a pool of PCRFs. In the instant embodiment, DRA 108 generates a new entry associating the second session involving UE 102 with a newly selected non-overloaded PCRF, such as second PCRF $114_B$.

At block 226, DRA 108 splits the routing or binding entry for a subscriber (e.g., UE 102) having multiple respective PDN connections and multiple IP addresses and diverts traffic to another Diameter node. As a result, traffic associated with a single subscriber or User-ID (e.g., UE 102) may be bound and/or assigned to multiple different PCRFs within a pool of PCRFs $114_A$ to $114_N$. DRA 108 is configured to split a routing entry into multiple entries and divert subscriber traffic from a severely loaded PCRF (e.g., $PCRF_A$) to an alternate PCRF that is minimally loaded (e.g., $PCRF_B$) based upon OL levels and/or a degree of OL detected by DRA 108. DRA 108 is configured to maximize service in a core, in some aspects, by diverting traffic from an assigned PCRF when the assigned PCRF is overloaded. DRA 108 may divert traffic by generating a new entry in a binding (routing) table, and by assigning different PDN connections of UE 102 to different PCRFs and/or different destination addresses or identifiers. The new PCRF may be assigned according to any routing rules, algorithms, according to load metrics, or the like, as long as the alternate PCRF has capacity to handle the load.

Table 3 below is an exemplary embodiment of a routing table including a routing entry that has been split by DRA 108 for use in intelligent routing for providing overload control via diverting traffic away from an overloaded PCRF. Table 3 is similar to Table 1 described above; however, Table 3 has a new entry designated "1A", which is split from original entry 1 in Table 1. The split entry (row) is also designated in Table 3 by asterisks (*), and is an example of a local diversion of traffic initiated by DRA 108.

TABLE 3

| Entry # | Subscriber (User) ID | IP Address | APN | Destination ID | Timestamp |
|---|---|---|---|---|---|
| 1 | User-ID-1 | IP:10.0.0.1 | IMS | PCRFA | 2015-10-01 02:00:00 |
| *1A | *User-ID-1 | *IP:10.0.0.4 | *IMS | *PCRFB | *2015-10-01 05:00:00 |
| 2 | User-ID-2 | IP:10.0.0.2 | INTERNET | PCRFA | 2015-10-01 03:00:00 |
| 3 | User-ID-N | IP:10.0.0.3 | INTERNET | PCRFN | 2015-10-01 04:00:00 |

As Table 3 indicates above, a first User-ID associated with UE 102 includes two entries in a routing/binding table. The first User-ID "User-ID-1" is associated with two IP addresses, and is assigned to two different destinations, namely first $PCRF_A$ and second $PCRF_B$ by DRA 108.

At line 228, DRA 108 routes traffic (e.g., a policy session request) to the newly assigned PCRF (i.e., second PCRF 114$_B$). At line 230, second PCRF 114$_B$ responds with an answer message. At line 232, DRA 108 communicates the answer to PGW 106. FIG. 2 is illustrative of a local diversion, where DRA 108 routes traffic from a single subscriber to multiple PCRFs within a pool of PCRFs to divert traffic from an overloaded PCRF (e.g., first PCRF 114$_A$).

The binding table above (e.g., Table 3) contains information for multiple PDN connections having multiple IP addresses, where each is mapped to a different destination (e.g., a different PCRF). DRA 108 is configured to prefer the most recently selected PCRF based upon a timestamp, or any other timing information associated with the binding, for any subsequent PDN connection requests, so that the binding will eventually converge back to a single destination (e.g., a single PCRF). If there are no PCRFs within a pool of PCRFs that DRA 108 manages that are not overloaded, then DRA 108 may divert the session request to a remote site where a remote DRA (e.g., 108$_N$, FIG. 1) is managing another pool of PCRFs (e.g., 116, FIG. 1), which are not overloaded. One embodiment of remote diversion is shown and described in FIG. 3. In some embodiments, each DRA 108 within a network (e.g., 100, FIG. 1) can use the same subscribe/notify mechanism which is used between DRA 108 and PCRFs (e.g., 114$_A$ to 114$_N$) it manages such that the DRAs will notify each other when they are available. That is, DRA 108 may subscribe to remote DRA 108$_N$ for determining processing availability for remote diversion.

It will be appreciated that FIG. 2 is for illustrative purposes and that additional steps and/or messaging other than those depicted in FIG. 2 can be usable for diverting Diameter traffic from an overloaded PCRF to an alternate PCRF. Additionally, it will be appreciated that steps depicted in FIG. 2 can occur in a different order than depicted or can be combined.

Figure 3:
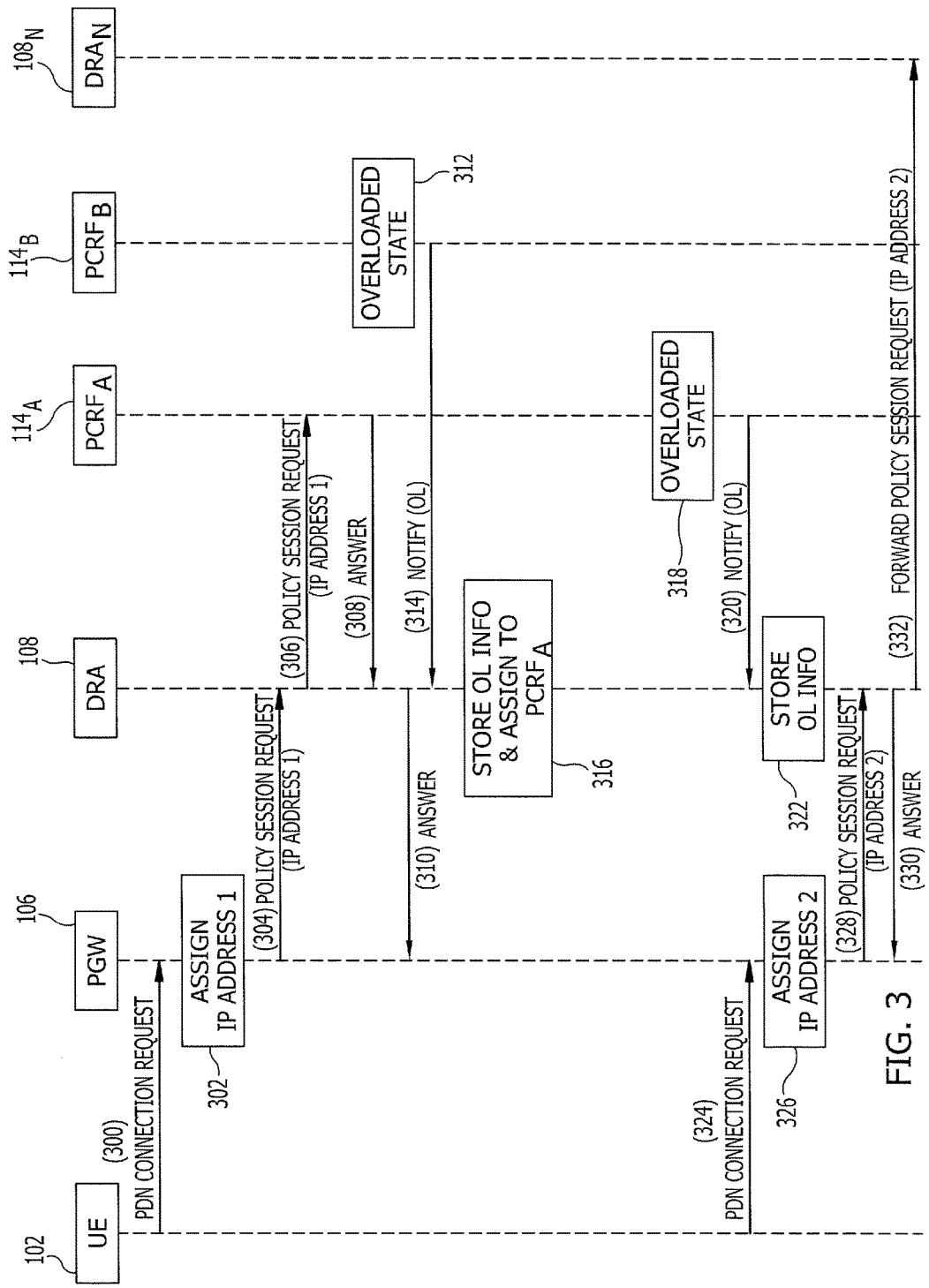
FIG. 3 is a message diagram illustrating exemplary messaging exchanged by and/or between special purpose computing entities for remotely diverting Diameter traffic from an overloaded PCRF according to an embodiment of the subject matter described herein.

FIG. 3 is a message diagram illustrating exemplary messaging exchanged by and/or between special purpose computing entities for remotely diverting Diameter traffic from an overloaded PCRF according to an embodiment of the subject matter described herein.

At line 300, UE 102 sends a PDN connection request to PGW 106. At block 302, PGW 106 establishes a connection and assigns the session request from UE 102 a first IP address (e.g., "IP Address 1").

At line 304, PGW 106 sends a new policy session request, requesting policy and charging information for the PDN connection IP address associated with UE 102.

At line 306, DRA 108 sends the policy session request to first PCRF 114$_A$ according to any routing algorithms or routing rules. The policy session request may include a CCR, an AAR, or the like. At line 308, first PCRF 114$_A$ sends an answer message (e.g., a CCA, an AAA, or the like) to the policy request received from DRA 108. The request message at line 306 requests establishment of the policy session, and the answer message at line 308 confirms the establishment. DRA 108 answers the policy session request at line 310.

At block 312, second PCRF 114$_B$ experiences an overloaded state. At line 314, second PCRF 114$_B$ notifies DRA 108 of the overloaded state. At block 316, DRA 108 stores the OL information (e.g., an OL level) associated with second PCRF 114$_B$ and assigns UE 102 and first PDN connection to first PCRF 114$_A$. Although not shown for illustration purposes only, PGW 106, DRA 108 and first PCRF 114$_A$ can continue to communicate policy traffic, such as policy session request and answer messages (e.g., CCR, CCA messages, or the like).

At block 318, first PCRF 114$_A$ reaches an overloaded state, to the point that it can no longer take new session requests from existing (previously assigned) subscribers. At line 320, first PCRF 114$_A$ notifies DRA 108 that it is overloaded. In some embodiments, DRA 108 receives an OL level from first PCRF 114$_A$, for example, an integer between 0 and 3 as described in Table 2 above.

At block 322, DRA 108 stores the OL information received from first PCRF 114$_A$ in a storage element. The OL level may include a numerically increasing integer where "0" is interpreted as a PCRF being "not overloaded" and "1" is interpreted as a first, lowest overload level, "2" is a second, intermediate overload level, and "3" is a severely overloaded level. DRA 108 utilizes the OL information (e.g., OL levels) for intelligent routing, for example, by diverting traffic away from and/or around overloaded PCRFs. In some aspects, traffic is diverted away from PCRFs having a level of 2 or 3. Any reference character may be used to indicate a percentage, level, or quantifying aspect of OL.

At line 324, UE 102 initiates a new (e.g., second) PDN connection request with PGW 106. This may occur, for example, where UE 102 executes applications requiring multiple PDN connections, or the like. UE 102 may establish multiple sessions with PGW 106. In response to multiple session requests, PGW 106 may assign UE 102 multiple IP addresses. At block 326, PGW 106 assigns the new PDN connection with UE 102 a second IP address (e.g., "IP Address 2").

At line 328, PGW 106 sends a new policy session request to DRA 108. At line 330, DRA 108 answers the request, and at line 332, DRA 108 forwards the request to a remote DRA 108$_N$, as each PCRF within the pool of PCRFs managed by DRA 108 are overloaded (e.g., in the exemplary embodiment the "pool" of PCRFs includes PCRF$_A$ and PCRF$_B$, which are each in an overloaded state).

Notably, DRA 108 is configured to remotely divert traffic to a different DRA having a different PCRF pool for processing the request, thereby minimizing the number of rejected requests. DRA 108 may split the binding entry for UE 102 into multiple entries, one entry per PDN connection and destination ID. Notably, a single UE 102 may be assigned to different destination nodes and have different bindings. One entry will have the new routing information associated with UE 102, in which it is assigned to remote DRA 108$_N$ and a remote PCRF (e.g., within a remote pool of PCRFs 116, FIG. 1).

In some embodiments, any number of criteria can be used for DRA 108 to determine whether remote server (e.g., remote DRA 108$_N$) is available for remote diversion, but there should be at least one non-overloaded PCRF that remote DRA 108$_N$ manages so that DRA 108 may implement remote diversion of policy traffic. DRA 108 can then forward the new session establishment request (e.g., at line 332) to another DRA server in the network, which are currently accepting remote diversion. As previously indicated, each DRA within a network (e.g., 100, FIG. 1) may utilize a subscribe/notify mechanism to communicate with other DRAs to determine the availability of PCRFs available and/or required to implement a remote diversion.

Table 4 below is an exemplary embodiment of a routing table having routing information that has been split by DRA 108 in response to for use in intelligent routing for providing overload control via diverting traffic away from overloaded PCRFs. Table 4 is similar to Table 1 described above;

however, Table 4 has a new entry designated "1A", which has been split from original entry 1 in Table 1. The new entry also is designated in Table 4 by asterisks (*), and is an example of remote diversion of traffic as initiated by DRA 108.

TABLE 4

| Entry # | Subscriber (User) ID | IP Address | APN | Dest. ID | Timestamp |
|---|---|---|---|---|---|
| 1 | User-ID-1 | IP:10.0.0.1 | IMS | PCRFA | 2015-10-01 02:00:00 |
| *1A | *User-ID-1 | *IP:10.0.0.5 | *IMS | *DRAN | *2015-10 -01 06:00:00 |
| 2 | User-ID-2 | IP:10.0.0.2 | INTERNET | PCRFA | 2015-10-01 03:00:00 |
| 3 | User-ID-2 | IP:10.0.0.3 | INTERNET | PCRFN | 2015-10-01 04:00:00 |

As Table 4 indicates above, a first subscriber having a user ID "User-ID-1" associated with UE 102 includes two entries in a routing/binding table. The first user ID is associated with two IP addresses and associated with and/or assigned to two different destination entities having two different destination identifiers, namely a first $PCRF_A$ and a remote DRA (e.g., $DRA_N$). Thus, policy traffic may be diverted and/or re-routed to one or more Diameter nodes, such as another DRA.

It will be appreciated that FIG. 3 is for illustrative purposes only and that additional steps and/or messaging other than those depicted in FIG. 3 can be usable for diverting Diameter traffic away from an overloaded PCRF. Additionally, it will be appreciated that steps depicted in FIG. 3 can occur in a different order than depicted or can be combined.

FIG. 4 is a block diagram illustrating a special purpose computer including DRA 108 suitable to divert Diameter traffic from an overloaded PCRF (e.g., $114_A$ to $114_N$, FIG. 1) according to an embodiment of the subject matter described herein.

Referring to FIG. 4, DRA 108 includes at least one processor 400, at least one memory 402, and at least one network interface 404. Processor 400 may include a physical hardware processor having a single core or multiple cores. Processor 400 may also be a virtual processor that runs on a hypervisor layer that control access to underlying processor hardware.

Memory 402 may be volatile or non-volatile memory that stores instructions executed by processor 400. As with processor 400, memory 402 may be a physical memory chip or virtualized memory that is mapped to one or more physical memory chips by a hypervisor layer.

Network interface 404 may be a physical or virtual interface for sending packets to and receiving packets from a network (e.g., core 104, FIG. 1), within a network, and/or between network elements. In some embodiments, network interface 404 is configured to send and/or receive OL information (e.g., OL notifications with OL levels, etc.) and/or session requests (e.g., from PGW 106, FIG. 1). In other embodiments, network interface 404 is configured to send and receive message traffic between DRA 108 and one or more PCRFs (e.g., $114_A$ to $114_N$, FIG. 1) and DRA 108 and additional nodes (e.g., PGW 106, FIG. 1, access nodes, policy enforcement nodes, or the like) communicating traffic that requires processing by a PCRF.

In the illustrated example, memory 402 stores a routing engine 112 and a DM 110 having access to storage 406. Storage 406 may contain one or more databases or tables having routing rules (e.g., binding rules), routing informa-tion (e.g., binding information), OL information (e.g., OL levels, or the like) for providing intelligent routing. DM 110 is configured to access OL information and binding information from storage 406 for diverting traffic away from overloaded PCRFs. Routing engine 112 is configured to receives all messages and DM 110 performs a lookup in storage 406 (e.g., a table, a data record, a cache, a database, etc.) to determine whether message traffic should continue to be routed to an assigned PCRF or whether the traffic should be diverted to another PCRF (e.g., local diversion) or another DRA (e.g., remote diversion). DRA 108 may also access storage 406 to determine server assignment, so that traffic associated with previously assigned subscribers is diverted away from overloaded PCRFs and assigned to the least overloaded PCRFs.

Routing engine 112 is configured to receive message traffic and utilize DM 110 to determine how to assign and/or route the message traffic. Routing engine 112 routes and/or processes message traffic as instructed by DM 110 according to routing tables with routing (binding) information. In some embodiments, DM 110 splits one or more entries of a routing table in storage 406 and assigns traffic from one subscriber to multiple destinations (e.g., Diameter nodes, PCRFs, etc.) according to OL information that is also disposed in storage 406. DM 110 updates routing information in storage 406, and routes subsequent sessions from a given subscriber according to a latest timestamped entry, so that ultimately (e.g., as sessions drop off or terminate), the assignments converge and a subscriber is assigned to a single (same) destination. Routing may be assigned according to an OL level of an assigned PCRF, and any other parameter (e.g., message type, interface type, application type, APN, etc.), where desired.

It is understood that the architecture illustrated in FIG. 4 is exemplary and simplified in that a DRA 108 may include additional or alternative components without departing from the scope of the subject matter described herein. In one example, DRA 108 may be implemented on a processor blade in a rack-mounted system. Multiple DRA 108 processor blades may plug into a backplane to form a shelf. The DRA 108 processor blades may themselves operate in a stateful and redundant manner. In addition, DRA 108 may be a virtual server that runs on a hypervisor layer that shares access to underlying hardware, such as processor, memory, and network interfaces.

It will further be appreciated that FIG. 4 is for illustrative purposes and that various components, their locations, and/or their functions described above in relation to FIG. 4 may be changed, altered, added, and/or removed.

Figure 5:
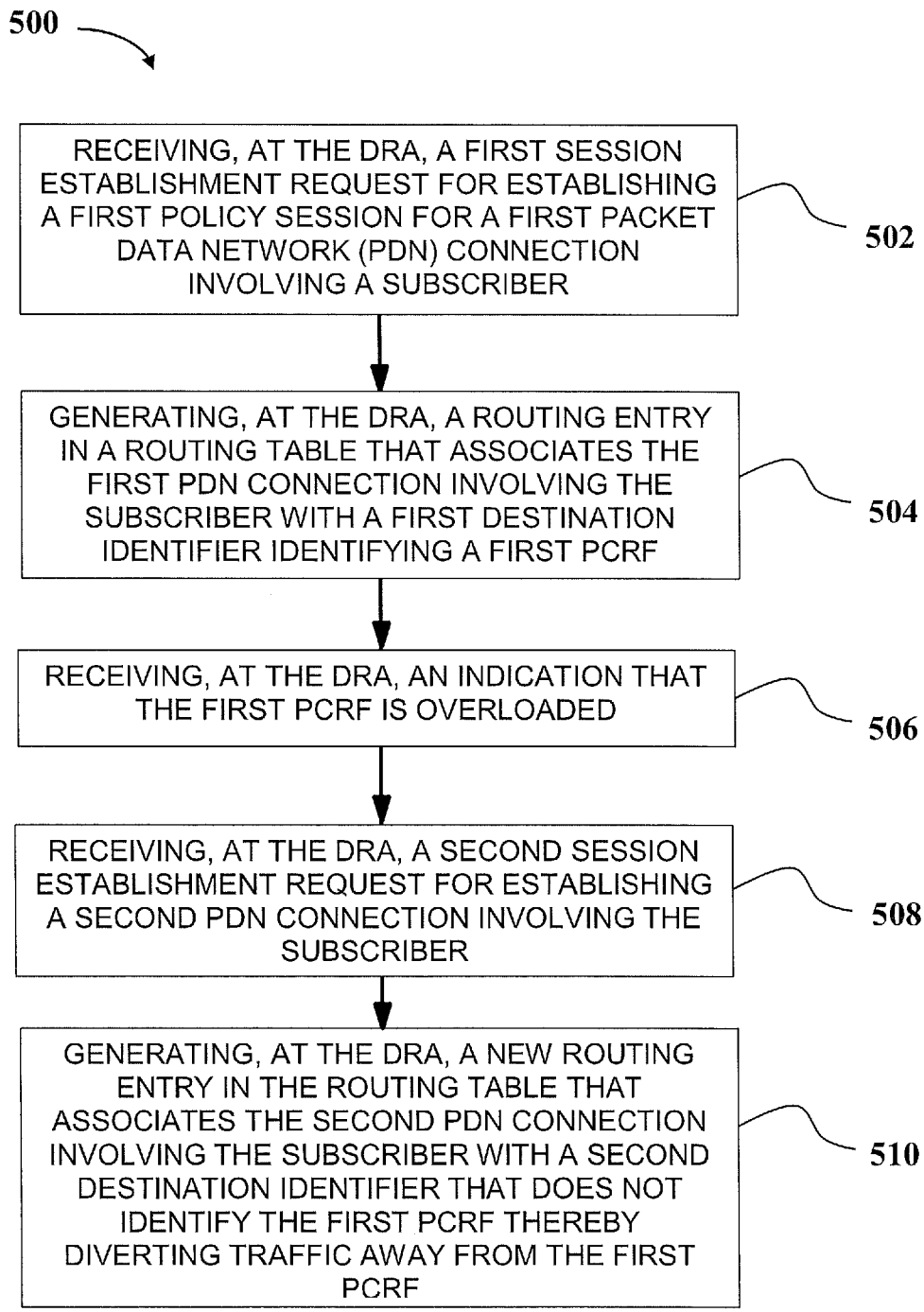
FIG. 5 is a flow chart illustrating an exemplary process for diverting Diameter traffic from an overloaded PCRF via a special purpose computer according to an embodiment of the subject matter described herein.

FIG. 5 is a flow chart illustrating an exemplary process generally designated 500 for diverting Diameter traffic from an overloaded PCRF via a special purpose computer according to an embodiment of the subject matter described herein. In some embodiments, process 500 is performed at a DRA, for example, upon deployment and/or provision of a core having a DRA.

In block 502, the DRA receives a first session establishment request for establishing a first policy session for a first PDN connection involving a subscriber. In some embodiments, the first session establishment request includes a first connection identifier such as an IP address, see e.g., Tables 1, 3, and 4). In some embodiments, the first IP address is an identifier that is assigned by an access node (e.g., PGW 106, FIG. 1).

In block 504, the DRA is configured to generate a routing entry in a routing (binding) table that associates the first PDN connection (e.g., having a first IP address) involving the subscriber with a first destination identifier identifying a first PCRF. The routing entry may also associate a first IP address with an APN, the first destination identifier, and a timestamp at which the entry was created. In some embodiments, the destination identifier corresponds to a first PCRF. That is, the DRA is configured to assign traffic from the subscriber to the first PCRF.

Notably, where the first PCRF becomes overloaded, the DRA may split the routing entry and generate a new entry, such that one, single subscriber or User-ID is associated with two different destination identifiers (e.g., two different PCRFs, two different Diameter nodes, one PCRF and a remote DRA, or the like). Thus, the DRA splits policy traffic involving the subscriber between the multiple PCRFs (e.g., first PCRF and a second PCRF), multiple Diameter nodes (e.g. a DRA, etc.), or combinations thereof. In some embodiments, the DRA establishes a first policy and charging control session for the subscriber, and traffic associated with the first policy and charging control session is routed to the first PCRF In block 506, the DRA receives an indication that the first PCRF is overloaded. The DRA subscribes to receive overload notifications (e.g., overload levels) from each PCRF within a pool of PCRFs. Overload notifications may include an overload level (e.g., 0 to 3) indicative of a level of overload it is currently experiencing.

In block 508, the DRA receives a second session establishment request for establishing a second PDN connection involving the (same) subscriber. The second session establishment request may include a second connection identifier, such as a second IP address. The second IP address may be assigned by an access node, such as a PGW or the like (e.g., FIG. 1).

In block 510, the DRA is configured to generate a new routing entry in the routing table that associates the second PDN connection (e.g., having a second IP address) involving the subscriber with a second destination identifier that does not identify the first PCRF thereby diverting traffic away from the first PCRF. The new routing entry may also associate the second IP address with an APN, the second destination identifier, and a timestamp at which time the entry was created, established, saved, generated, and/or updated. The second destination identifier may include another Diameter node, a second PCRF, or another DRA having a different pool of PCRFs with capacity to process the policy requests.

It will be appreciated that process 500 is for illustrative purposes and that different and/or additional actions may be used. It will also be appreciated that various actions described herein may occur in a different order or sequence.

Intelligent routing as described herein functions on special purpose computers, computing entities, and/or computing platforms, such as DRAs (e.g., 108, $108_N$) and PCRFs (e.g., $114_A$ to $114_N$). Intelligent routing cannot be performed manually, as routing policy messages within a packet network and other services provided via DRAs and PCRFs are necessarily rooted in computing technology. The routing functionality and ability to divert traffic (i.e., packets) originating from a same subscriber from an assigned server as described herein improves the functionality and/or efficiency associated with server assignment, server allocation and/or PCRF utilization within a network, as routing and processing packets between network components (e.g., DRA, PCRFs, etc.) and the core network in general is more intelligent, simplified, and less costly. The routing and functionality of DRAs and PCRFs described herein also improves network communications as the number of rejected requests is minimized.

Intelligent routing, diverting, and server assignment as described herein also provides intelligent overload control within a network. Intelligent routing described herein improves the technological field of server assignment, server allocation, packet routing, and user defined networking via implementation of configurable server assignments, and routing of packets that require processing for policy and charging control. By implementing intelligent routing via splitting routing or binding information and server assignments described herein, server utilization, allocation, and efficiency is also increased. Moreover, systems, methods, and computer readable media herein are configured to protect overloaded PCRFs, which is important in customer deployments having high transaction rates. The subject matter herein further maximizes service during overload, which reduces damage caused by receiving traffic that exceeds of a given PCRF's rated capacity.

Systems, methods, and computer readable media herein are configured to allow the DRA to use intelligence to route traffic away from the PCRFs it manages and any other DRAs in the network in order to maximize service. It protects a network against a case where one or more PCRFs become overloaded for an extended period of time. Instead of rejecting requests, the DRA can divert the requests to other PCRFs in the network that have the capacity to handle (process) the requests. Thus, systems, methods, and computer readable media herein are special purpose computers configured to reduce the chance of requests failing when PCRFs become overloaded. It allows network providers the opportunity to better utilize all the servers deployed in a network such that one single overloaded component will not continuously disrupt service for a portion of the subscriber base.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for implementing intelligent routing via diverting Diameter traffic from an overloaded Policy and Charging Rules Function (PCRF), the method comprising:
   at a Diameter Routing Agent (DRA):
      receiving, at the DRA, a first session establishment request for establishing a first policy session for a first packet data network (PDN) connection involving a subscriber;
      generating, at the DRA, a routing entry in a routing table that associates the first PDN connection involving the subscriber with a first destination identifier identifying a first PCRF;
      receiving, at the DRA, an indication that the first PCRF is overloaded;
      receiving, at the DRA, a second session establishment request for establishing a second PDN connection involving the subscriber; and
      generating, at the DRA, a new routing entry in the routing table that associates the second PDN connection involving the subscriber with a second destination identifier that does not identify the first PCRF thereby diverting traffic away from the first PCRF.

2. The method of claim 1, wherein generating a new routing entry in the routing table comprises assigning the second PDN connection involving the subscriber to a second PCRF.

3. The method of claim 1, wherein generating a new routing entry in the routing table comprises assigning the second PDN connection involving the subscriber to a second, remote DRA.

4. The method of claim 1, further comprising storing the routing table in a memory of the DRA.

5. The method of claim 1, wherein receiving an indication that the first PCRF is overloaded comprises receiving an overload level indicative of a level of overload that the first PCRF is experiencing.

6. The method of claim 5, further comprising storing the overload level in a memory of the DRA.

7. The method of claim 1, further comprising forwarding the second establishment request to a second DRA.

8. The method of claim 1, wherein the DRA splits policy traffic involving the subscriber between the first PCRF and a second PCRF.

9. The method of claim 1, further comprising subscribing, at the DRA, to the first PCRF to receive overload notifications from the first PCRF.

10. The method of claim 1, further comprising receiving a third policy session establishment request for a third PDN connection involving the subscriber and generating a new routing entry in the routing table that assigns the third PDN connection to a destination identifier assigned to the second PDN connection.

11. A system for implementing intelligent routing via diverting Diameter traffic from an overloaded Policy and Charging Rules Function (PCRF), the system comprising:
a Diameter Routing Agent (DRA) configured to receive a first session establishment request for establishing a first policy session for a first packet data network (PDN) connecting involving a subscriber and generate a routing entry in a routing table that associates the first PDN connection involving the subscriber with a first destination identifier identifying a first Policy and Charging Rules Function (PCRF); and
a diverting module accessible by the DRA, wherein the diverting module is configured to receive an indication that the first PCRF is overloaded and, in response to the DRA receiving a second session establishment request for establishing a second policy session for a second PDN connection involving the subscriber, the diverting module is configured to generate a new routing entry in the routing table that associates the second PDN connection involving the subscriber with a second destination identifier that does not identify the first PCRF for diverting traffic away from the first PCRF.

12. The system of claim 11, wherein the new routing entry in the routing table binds the second PDN connection involving the subscriber to a second PCRF.

13. The system of claim 11, wherein the new routing entry in the routing table binds the second PDN connection involving the subscriber to a second, remote DRA.

14. The system of claim 11, wherein the routing table is stored in a memory of the DRA.

15. The system of claim 11, wherein the indication that the first PCRF is overloaded includes a overload level indicative of a level of overload that the first PCRF is experiencing.

16. The system of claim 15, wherein the overload level is stored in a memory of the DRA.

17. The system of claim 11, wherein DRA is configured to route the second establishment request to a second DRA.

18. The system of claim 11, wherein the DRA splits policy traffic involving the subscriber between the first PCRF and a second PCRF.

19. The system of claim 11, wherein the DRA subscribes to the first PCRF for receiving overload notifications from the first PCRF.

20. The system of claim 11, wherein, in response to receiving a third policy session establishment request for a third PDN connection involving the subscriber, the DRA generates a new routing entry in the routing table that assigns the third PDN connection to a destination identifier assigned to the second PDN connection.

21. A non-transitory computer readable medium having stored thereon executable instructions that when executed by a processor of a computer control the computer to perform steps comprising:
receiving, at a DRA, a first session establishment request for establishing a first policy session for a first packet data network (PDN) connection involving a subscriber;
generating, at the DRA, a routing entry in a routing table that associates the first PDN connection involving the subscriber with a first destination identifier identifying a first PCRF;
receiving, at the DRA, an indication that the first PCRF is overloaded;
receiving, at the DRA, a second session establishment request for establishing a second PDN connection involving the subscriber; and
generating, at the DRA, a new routing entry in the routing table that associates the second PDN connection involving the subscriber with a second destination identifier that does not identify the first PCRF thereby diverting traffic away from the first PCRF.

* * * * *

UNITED STATES PATENT AND TRADEMARK OFFICE
CERTIFICATE OF CORRECTION

PATENT NO. : 9,800,504 B2
APPLICATION NO. : 14/918541
DATED : October 24, 2017
INVENTOR(S) : Renzullo et al.

It is certified that error appears in the above-identified patent and that said Letters Patent is hereby corrected as shown below:

In the Specification

In Column 8, Line 34, delete "PCRFA" and insert -- $PCRF_A$ --, therefor.

In Column 8, Line 35, delete "PCRFA" and insert -- $PCRF_A$ --, therefor.

In Column 8, Line 36, delete "PCRFN" and insert -- $PCRF_N$ --, therefor.

In Column 10, Line 55, delete "PCRFA" and insert -- $PCRF_A$ --, therefor.

In Column 10, Line 57, delete "*PCRFB" and insert -- $*PCRF_B$ --, therefor.

In Column 10, Line 59, delete "PCRFA" and insert -- $PCRF_A$ --, therefor.

In Column 10, Line 60, delete "PCRFN" and insert -- $PCRF_N$ --, therefor.

In Column 11, Line 62, delete "$114_8$" and insert -- $114_B$ --, therefor.

In Column 13, Line 11, delete "PCRFA" and insert -- $PCRF_A$ --, therefor.

In Column 13, Line 12, delete "*DRAN" and insert -- $*DRA_N$ --, therefor.

In Column 13, Line 14, delete "PCRFA" and insert -- $PCRF_A$ --, therefor.

In Column 13, Line 16, delete "PCRFN" and insert -- $PCRF_N$ --, therefor.

In Column 15, Line 21, after "PCRF" insert -- . --.

Signed and Sealed this
Nineteenth Day of June, 2018

Andrei Iancu
*Director of the United States Patent and Trademark Office*